United States Patent [19]
Boer et al.

[11] Patent Number: 5,706,428
[45] Date of Patent: Jan. 6, 1998

[54] MULTIRATE WIRELESS DATA COMMUNICATION SYSTEM

[75] Inventors: Jan Boer, Odijk; Wilhelmus Josephus Diepstraten, Diessen; Adriaan Kamerman, Nieuwegein; Hendrik van Bokhorst, Nijkerk; Hans van Driest, Bilthoven, all of Netherlands

[73] Assignee: Lucent Technologies Inc., Murray Hill, N.J.

[21] Appl. No.: 615,408

[22] Filed: Mar. 14, 1996

[51] Int. Cl.⁶ .................. H04Q 1/30; H04L 12/28
[52] U.S. Cl. .......... 395/200; 370/349; 370/342; 370/465; 375/202; 375/206; 375/347
[58] Field of Search .................. 370/349, 342, 370/338, 465; 375/202, 206, 347, 349; 395/200.13, 200.1

[56] References Cited

U.S. PATENT DOCUMENTS

| | | | |
|---|---|---|---|
| 5,206,881 | 4/1993 | Messenger et al. | 375/1 |
| 5,379,290 | 1/1995 | Kleijne | 370/85.2 |
| 5,592,468 | 1/1997 | Sato | 370/252 |

OTHER PUBLICATIONS

Wilkinson Tom; "High Data Rate Radio LANs", IEEE, pp. 3/1–3/8. No Date.

Hayes, Victor; "Standardization Efforts for Wireless LANs", IEEE Network Magazine, pp. 19–20, Nov. 1991.

"Welcome to IEEE P802.11"; Working Group for Wireless Local Area Networks; Set-up on Dec. 17, 1996, update of May 20, 1997.

"Bell Labs Unveils 10–Megabit Wireless–Network Technology, Offering Five Times Today's Highest Data–Transmission Capacity"; ICA New Product Announcment, Apr. 22, 1997.

Primary Examiner—James P. Trammell
Assistant Examiner—Shah Kaminis
Attorney, Agent, or Firm—Christopher N. Malvone

[57] ABSTRACT

A wireless LAN includes first stations adapted to operate at a 1 or a 2 Mbps data rate and second stations adapted to operate at a 1,2,5 or 8 Mbps data rate. The 1 and 2 Mbps rates use DBPSK and DQPSK modulation, respectively. The 5 and 8 Mbps rates use PPM/DQPSK modulation. All four data rates use direct sequence spread spectrum (DSSS) coding. All transmitted messages start with a preamble and header at the 1 Mbps rate. The header includes fields identifying the data rate for the data portion of the message, and a length field. For a 2 Mbps transmission the length field identifies the number of bytes in the data field. For a 5 or 8 Mbps the length field identifies the number of bytes in the data field which, if transmitted at 2 Mbps, would take the same transmission time of the data field, and is thus a fraction ⅖ or ⅜ of the actual number of the bytes. With this arrangements, all the stations are interoperable in a co-existent manner in the LAN.

6 Claims, 6 Drawing Sheets

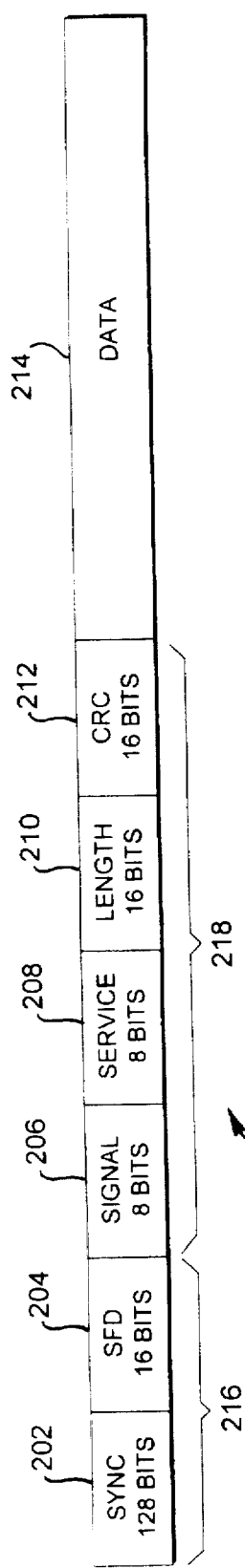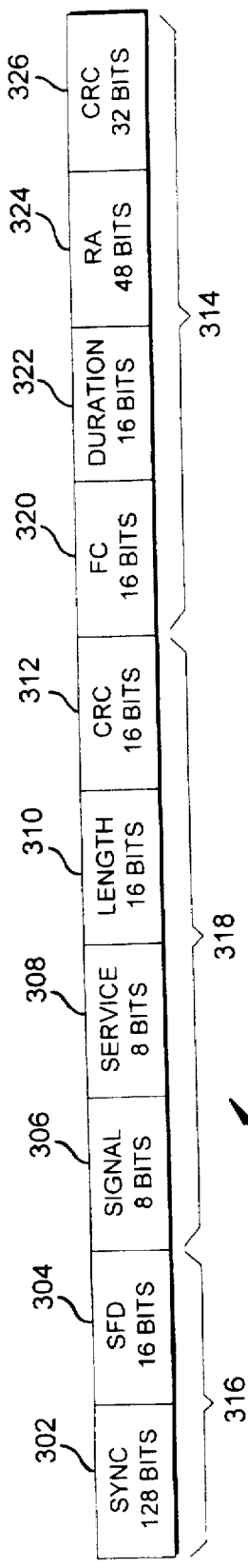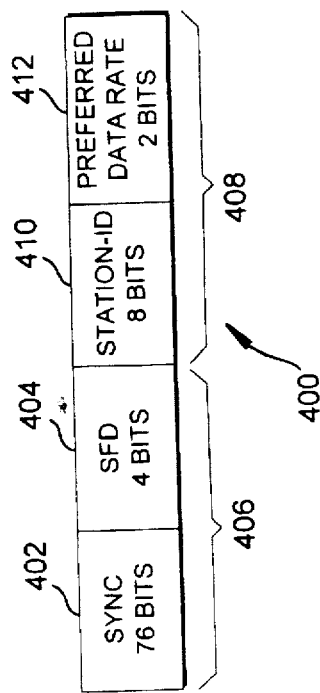
FIG. 4
FIG. 5
FIG. 6

MULTIRATE WIRELESS DATA COMMUNICATION SYSTEM

FIELD OF THE INVENTION

This invention relates to wireless data communication systems.

BACKGROUND OF THE INVENTION

With a view to obviating the need for wired cabling connections between stations in local area networks (LANs), wireless local area networks have been developed, and are now commercially available. These wireless local area networks employ stations, which may be data processing devices (such as PCs) having a wireless communication capability.

In view of this development, there is being produced IEEE standard 802.11, currently available in draft form, which specifies appropriate standards for use in wireless LANs. This standard specifies two possible data rates for data transmission, namely 1 Mbps (Megabit per second) and 2 Mbps. Accordingly, manufacturers have produced commercially available systems operating at these data rates. However, it may be advantageous to provide systems operating at higher data rates, which are not in accordance with the standard.

It is an object of the present invention to provide a method of operating a wireless local area network station which enables communication between stations operating at different data rates.

SUMMARY OF THE INVENTION

Therefore, according to the present invention, there is provided a method of operating a wireless local area network station adapted to transmit and receive messages at a plurality of data rates, wherein said messages include an initial portion and a data portion, including the steps of: transmitting the initial portion of a message to be transmitted by a station at a first predetermined one of a first plurality of data rates; including in said initial portion a data rate identification segment identifying a selected one of a second plurality of data rates, at which said data portion is to be transmitted, and a length segment representing the length of time which would be required for a transmission of said data portion at one of said first plurality of data rates; and transmitting said data portion at said selected one of said second plurality of data rates.

BRIEF DESCRIPTION OF THE DRAWINGS

One embodiment of the invention will now be described by way of example, with reference to the accompanying drawings, in which:

FIG. 4 is a diagram illustrating the format of a data message circulating in the LAN;

FIG. 5 is a diagram illustrating the format of a first type of acknowledgement message;

FIG. 6 is a diagram illustrating the format of a second type of acknowledgement message;

DETAILED DESCRIPTION OF THE INVENTION

Figure 1:
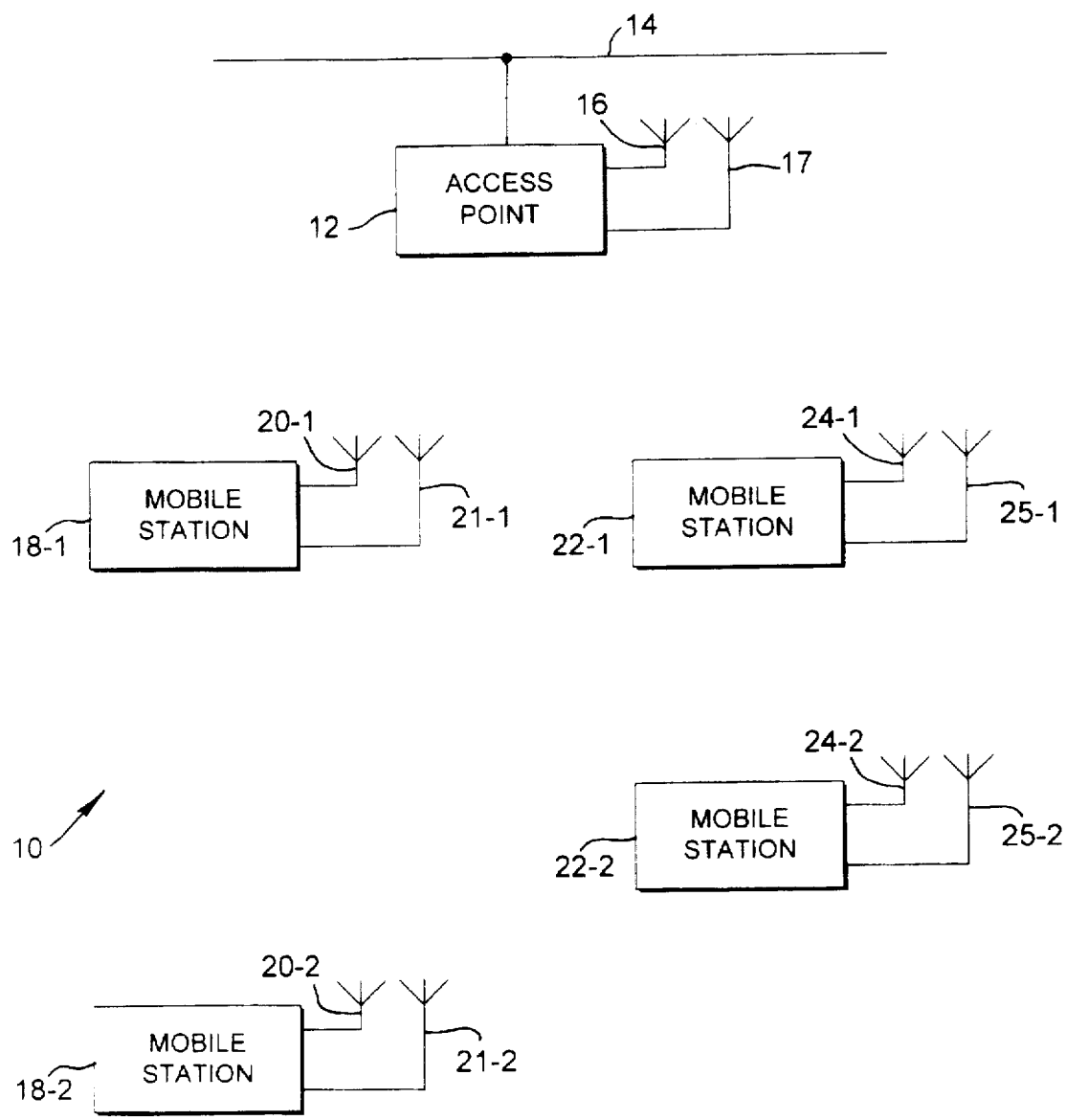
FIG. 1 is a block diagram of a wireless LAN embodying the present invention.

Referring first to FIG. 1, there is shown a preferred embodiment of a wireless LAN (local area network) 10 in which the present invention is implemented. The LAN 10 includes an access point 12, which serves as base station, and is connected to a cable 14 which may be part of a backbone LAN (not shown), connected to other devices and/or networks with which stations in the LAN 10 may communicate. The access point 12 has antennas 16 and 17 for transmitting and receiving messages over a wireless communication channel.

The network 10 includes mobile stations 18, referred to individually as mobile stations 18-1, 18-2, and having antennas 20 and 21, referred to individually as antennas 20-1, 20-2 and 21-1, 21-2. The mobile stations 18 are capable of transmitting and receiving messages selectively at a data rate of 1 Mbps (Megabit per second) or 2 Mbps, using DSSS (direct sequence spread spectrum) coding. When operating at the 1 Mbps data rate, DBPSK (differential binary phase shift keying) modulation of the RF carrier is utilized, and when operating at the 2 Mbps data rate DQPSK (differential quadrature phase shift keying) modulation of the RF carrier is utilized. Thus, it will be appreciated that both data rates are equivalent to a symbol rate of 1 MBaud (Megabaud), i.e. 1 symbol per second. Preferably the DSSS code utilized is an 11-chip Barker code having the values +1, −1, +1, +1, −1, +1, +1, +1, −1, −1, −1, the leftmost chip being the first in time.

Also included in the LAN 10 are further mobile stations 22, referred to individually as stations 22-1 and 22-2, and having antennas 24 and 25, referred to individually as antennas 24-1, 24-2 and 25-1, 25-2. The stations 22 can operate at a 1 Mbps or a 2 Mbps data rate, using the same modulation and DSSS coding as the stations 18, and in addition can also operate at two higher data rates, namely 5 Mbps and 8 Mbps. These 5 and 8 Mbps data rates utilize PPM/DQPSK (pulse position modulation—differential quadrature phase shift keying) in combination with the 11-chip Barker code mentioned hereinabove. At the 5 Mbps data rate there are used 1 out of 8 possible PPM positions, whereby there are 5 encoded bits per symbol interval (3 position bits plus 2 bits for quadrature phase information). At the 8 Mbps data rate the I- and Q-components are used separately. Thus there are 3 position bits for the I-component, 3 position bits for the Q-component, and 2 bits for quadrature phase information. It will be appreciated that the 5 and 8 Mbps data rates correspond to a 1 Mbaud symbol rate, just as do the 1 and 2 Mbps data rates.

From the above description, it will be appreciated that the LAN 10 contains mobile stations 18 of a first type (operating at 1 or 2 Mbps data rates) and mobile stations 22 of a second type (operating at 1,2,5 or 8 Mbps data rates). However, as will be explained hereinbelow, there is fully interoperable operation at the 1 and 2 Mbps data rates, and further, the stations 22 can operate at their higher data rates of 5 and 8 Mbps, in a manner co-existent with the operation of the staions 18.

Figure 2:
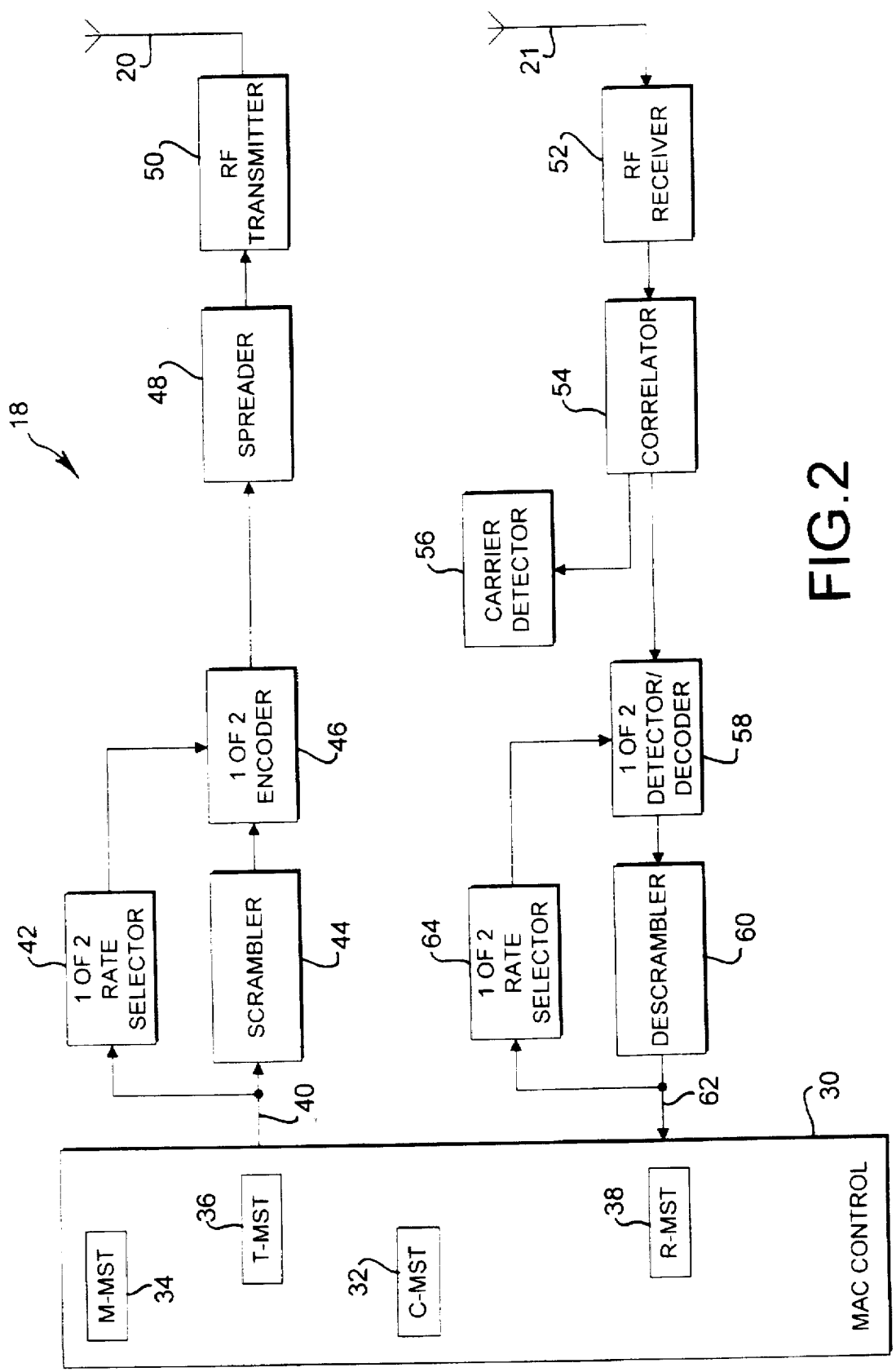
FIG. 2 is a block diagram of a wireless LAN station capable of operating at two data rates.

Referring now to FIG. 2, there is shown a functional block diagram illustrating, for a station 18, the interconnection of the functional blocks which relate to the implementation of the present invention. The block 30 represents a MAC (medium access control) control unit which includes four state machines, namely a MAC control state machine C-MST 32, a MAC management state machine M-MST 34, a transmitter state machine T-MST 36 and a receiver state machine R-MST 38. The MAC control unit 30 is shown as connected over a line 40 to a 1-out-of-2 rate selector 42 and a scrambler 44. The rate selector 42 and scrambler 44 are connected to a 1-out-of-2 encoder 46 which encodes the data bits from the scrambler 44 in accordance with the selected 1 or 2 Mbps data rate. The output of the encoder 46 is connected to a spreader 48 which effects the above-discussed spread spectrum coding and applies the signal to an RF front-end transmitter 50 for application to the antenna 20.

The receive antenna 21 is connected to an RF front-end receiver 52 which is connected to a correlator 54 which effects a correlation to "despread" the received signal. A first output of the correlator 54 is connected to carrier detector 56. A second output of the correlator 54 is connected to a 1-out-of-2 detector/decoder 58 which has an output connected to an input of a descrambler 60. The output of the descrambler 60 is connected over a line 62 to the MAC control unit 30 and to a 1-out-of-2 rate selector 64 which has an output connected to the detector/decoder 58 to control the detector/decoder 58 appropriately in accordance with control information contained in received messages.

Figure 3:
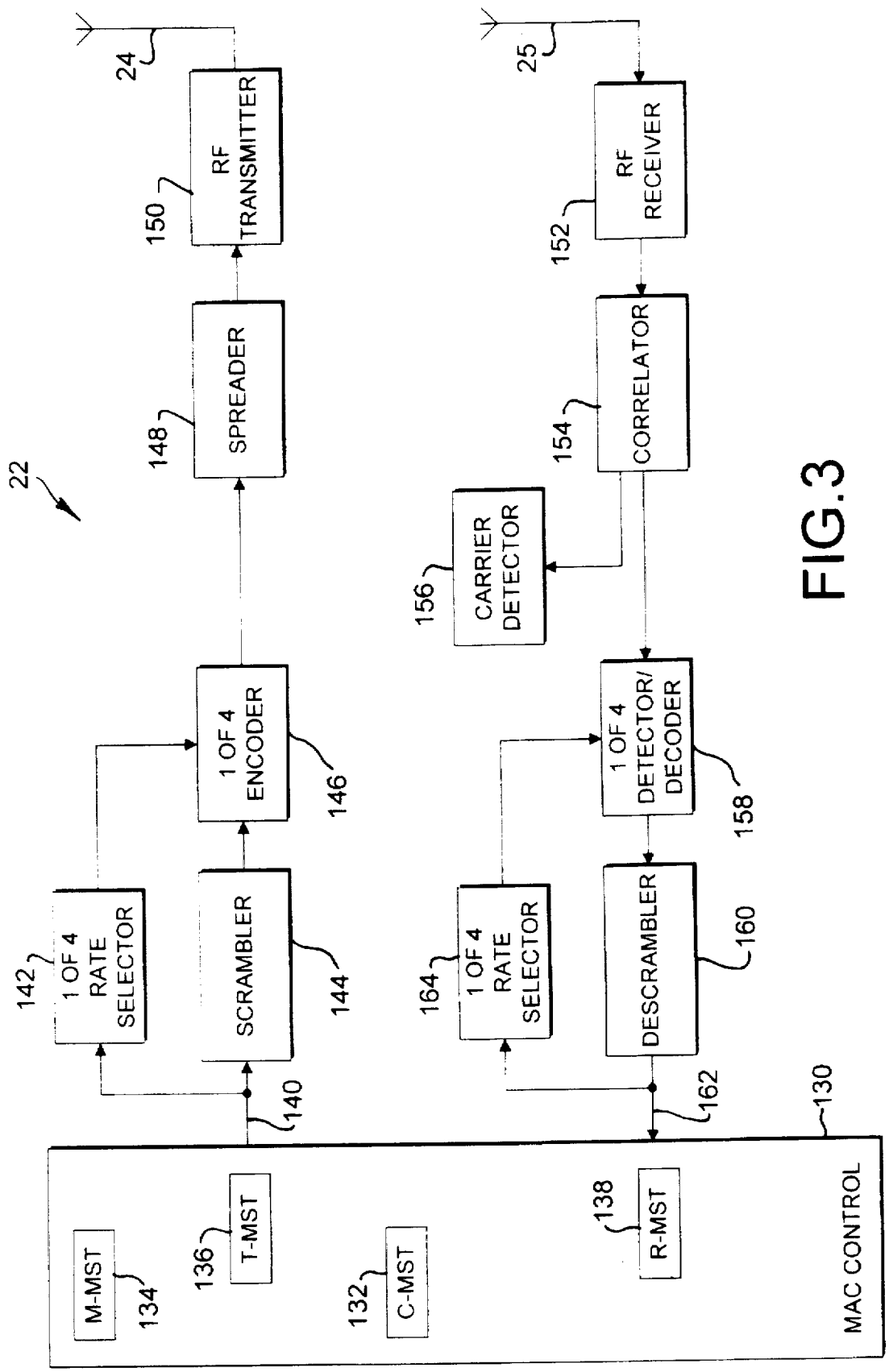
FIG. 3 is a block diagram of a wireless LAN station capable of operating at four data rates.

Referring now to FIG. 3, there is shown a functional block diagram illustrating the interconnection of the functional blocks included in a station 22, which relate to the implementation of the present invention. The arrangement of functional blocks for the stations 22 is similar to that of the functional blocks shown in FIG. 2 for the station 18. Consequently, similar functional blocks in FIG. 3 are prefixed by an initial 1. It will be appreciated that an important difference is that the rate selectors 142 and 164 are 1-out-of-4 rate selectors, rather than 1-out -of-2 rate selectors, as are the selectors 42 and 64 in FIG. 2. Similarly, the encoder 146 is a 1-out-of-4 encoder and the detector/decoder 158 is a detector/decoder for a selected one of four possible data rates. It will be appreciated that these differences arise since the station 22 is capable of operation at one of four possible data rates, whereas the station 18 is capable of operating only at one of two possible rates.

Referring now to FIG. 4, there is shown the format of a typical message 200 used in the LAN 10. The message 200 includes a 128-bit SYNC (synchronisation) field 202, a 16-bit SFD (start of frame delimiter) field 204, an 8-bit SIGNAL field 206 (to be explained), an 8-bit SERVICE field 208 (to be explained), a 16-bit LENGTH field 210 (to be explained), a 16-bit CRC check field 212, which provides a CRC check for the portions 206, 208 and 210, and finally a DATA field 214 which comprises a variable number of data "octets", that is 8-bit data segments, sometimes referred to as "bytes". The fields 202 and 204 are together conveniently referred to as a preamble 216 and the fields 206, 208, 210 and 212 are together conveniently referred to as a header 218.

With regard to the message 200, FIG. 4, it should be understood that the preamble 216 and header 218 are always transmitted at the 1 Mbps rate using DBPSK modulation. The subsequent DATA field 214, however, may be transmitted at a selected one of the four possible rates 1, 2, 5 or 8 Mbps, using the modulation and coding discussed hereinabove. Of course, the stations 18 are capable of transmitting at the 1 and 2 Mbps rates only, whereas the stations 22 can transmit the DATA field 214 at a selected one of the four data rates.

In more detail concerning the format of the message 200, the SYNC field 202 consists of 128 bits of scrambled "1" bits, enabling a receiving device to perform the necessary operations for synchronisation. The SFD field 204 consists of a predetermined 16-bit field identifying the impending start of the header 218. The SIGNAL field 206 has a first predetermined value if the DATA field 214 is transmitted at the 1 Mbps rate and a second predetermined value if the DATA field 214 is transmitted at the 2, 5 or 8 Mbps rates. The SERVICE field 208 has a first predetermined value (typically all zero bits) for the 1 and 2 Mbps rates, a second predetermined value for the 5 Mbps rate and a third predetermined value for the 8 Mbps rate. It should be understood at this point that the stations 18, adapted to operate at the 1 and 2 Mbps rates only, ignore the SERVICE field 208. This aspect will be discussed more fully hereinafter. The LENGTH field 210 contains, if the bit rate is designated as 1 or 2 Mbps, a value corresponding to the actual number of octets in the DATA field 214. However for the 5 and 8 Mbps rates, the LENGTH field 210 contains a value which is a fraction, $\frac{2}{5}$ and $\frac{2}{8}$, times the actual number of octets in the DATA field 214, respectively. These values correspond to the length in octets of a transmission at 2 Mbps which would give the same transmission time of the DATA field 214, which is actually transmitted at 5 Mbps, or 8 Mbps respectively.

Referring briefly to FIG. 1, it should be understood that the LAN 10 operates on a CSMA/CA (carrier sense multiple access with collision avoidance) protocol. According to this protocol, if a station wishes to transmit a message, it first senses the transmission channel. If the channel is sensed as free and has been free for a predetermined, interframe spacing time, then the message is transmitted immediately. If the channel is sensed as busy, then access is deferred until the channel becomes free and remains free for the short interframe spacing time. However, transmission of the message does not then take place immediately, but is further deferred for a random backoff time. This procedure alleviates contention problems where multiple stations are waiting to transmit. Of course, collisions are not completely avoided by this CSMA/CA protocol, but the chance of a collision is rendered very small.

In connection with the above, it should be noted that a station 18 will sense that the channel is busy only if the signal level is above a predetermined threshold level, referred to as the defer threshold level, and a simple DSSS type of signal is sensed. Thus a station 18 will not defer if, when it wishes to transmit, it senses a transmission involving a PPM type coding as well as DSSS coding, such as is used for the 5 and 8 Mbps transmissions of a station 22. In these circumstances the station 18 and 22 may mutilate each other's transmissions. It is in order to alleviate this problem, that the HEADER 218 of the messages transmitted by the stations 22 contains a representation of $\frac{2}{5}$ and $\frac{2}{8}$ times the actual number of octets in the DATA field 214 since this representation causes any station receiving it to defer for the length of time corresponding to the specified number of symbol intervals, regardless of the type of DSSS coding used.

The data rate capability of each station 18, 22 is supplied to the access point 12 in an initial access point association procedure when the station is initially operated in the LAN 10. Briefly, this procedure involves a transmission by the station of an association request frame and the consequent transmission by the access point 12 of an association response frame. The data rate capability of the station is then stored in a table (not shown) at the access point 12, which associates the ID of the station with a representation of the data rate capabilities of the station. Also, the association response message informs the newly associated station of the data rate capabilities of the other stations in the network 10.

A further feature of the present embodiment is that an acknowledgement procedure is utilised, that is, for each directed message transmitted by a station an ACK (acknowledgement) message is expected to be received in response. With this in mind, and referring to FIGS. 2 and 3, the operation of the MAC control units 30 and 130 will be briefly described.

The MAC management state machine M-MST 134 (FIG.3) includes a table (not shown) containing information relating to other stations, identified by their station ID code. Such table contains, for each station ID, counter values for the number of frames correctly received from that station, the number of frames transmitted to that station, for which an ACK frame has been correctly received, and the number of frames transmitted to that station for which an ACK frame has not been correctly received, together with the applied data rate, for each direction of frame transmission. The MAC control state machine C-MST 132 handles the control of the transmitter and receiver state machines T-MST 136 and R-MST 138. The transmit state machine T-MST 136 handles the timed control and the forwarding of the frames 200 (FIG.4) over the line 140 for transmission. The receive state machine R-mst 138 handles the timed control and forwarding of the frames 200 from the line 162 to the MAC control unit 130.

When a station 22 is to transmit a frame to a destination station, it accesses the table stored in the M-MST 134 to ascertain the data rate to be applied to the transmission to that station. The C-MST 132 inserts the preamble 216 and header 218 in the frame 200 (FIG. 4), and ascertains the data rate information from the table in the M-MST 134. Also, the C-MST 132 adds the LENGTH field 210, which, for 5 and 8 Mbps bits rates is, as discussed hereinabove, a fraction, ⅖ or ⅛, of the actual length in octets of the DATA field 214. As discussed hereinabove, the SIGNAL field 206 used at 5 and 8 Mbps data rate is the same as the SIGNAL field 206 for the 2 Mbps data rate.

With regard to transmission of a message by a station such as 18, if the channel is clear, a transmission can be initated. At the beginning of a transmission, the scrambler 44 will receive as an input the 128 bit SYNC field 202, followed by the SFD field 204, the header 218 and the DATA field 214. The rate selector 42 utilizes the SIGNAL field 206 to control the encoder 46 such that, after the last bit of the header portion 218, the data rate is maintained at 1 Mbps DBPSK mode or switched to the 2 Mbps DQPSK mode. The encoder 46 thus provides appropriately modulated signals at the 1 MBaud rate for application to the spreader 48 where the DSSS coding is effected. The RF transmitter 50 then effects conventional filtering, up-mixing and power amplification to provide a signal for application to the antenna 20.

With regard to receiving a signal in a station 18, when the channel is active, the carrier detector 56 provides a signal indicating the presence of a signal received by the antenna 21. The received signal is fed to the RF receiver 52, which effects conventional filtering, automatic gain control and down-mixing. The output signal from the RF receiver 52 is applied to the correlator 54, which produces a spike-waveform output signal. The detector/decoder 58 initially operates at the 1 Mbps data rate, and provides an output signal which is applied to the descrambler 60. After the SFD field 204 has left the descrambler 60 the rate selector 64 uses the SIGNAL field 206 to determine whether the detector/decoder 58 should remain in the 1 Mbps mode or switch to the 2 Mbps mode. If such switching takes place, then the DATA field 214 will be descrambled in the descrambler 60 and applied to the MAC control unit 30, using a 2 MHz clock.

In a station 22 which is to transmit a message, the C-MST 132 inserts the preamble 216 and header 218. As mentioned hereinabove, the SIGNAL field 206 is the same for the 5 and 8 Mbps data rates as for the 2 Mbps data rate, but the SERVICE field 208 differs. The rate selector 142 uses the SIGNAL and SERVICE fields 206, 208 to decide whether or not the encoder 146 should switch to the 2, 5 or 8 Mbps modes. If rate switching is to take place, then after the last bit of the header 218 has passed through, the rate selector 142 provides a control signal to the encoder, to switch from operation in the 1 Mbps DBPSK mode to the 2 Mbps DQPSK mode, 5 Mbps PPM/QPSK mode or the 8 Mbps PPM/QPSK mode, whereby the DATA field 214 is encoded in the selected manner.

In a station 22 which is receiving a message, the rate selector 164 uses the SIGNAL and SERVICE fields 206, 208 to determine whether to remain in the 1 Mbps mode or switch to the 2,5 or 8 Mbps mode. If the SIGNAL field 206 indicates the 2 Mbps mode, then the rate selector 164 provides, after the last bit of the header 218 has passed, a control signal to the detector/decoder 158 to switch to the 2, 5 or 8 Mbps mode, dependent on the value of the SERVICE field 208. Thus the DATA field 214 is descrambled in the descrambler 160, and clocked into the MAC control unit 130 at the appropriate 2, 5 or 8 Mbps clock rate. The C-MST 132 determines if an incoming message is addressed to its own station, using a destination address included in the data field 214 of the message 200. If the address matches, and the C-MST has checked a CRC field (not shown) that is part of the data field 214, then assuming there is no error, the C-MST forwards the data field 214 for further processing in the station, and forwards the data rate information to the M-MST 134, for storage in the aforementioned table under the relevant station ID. Note also that, following the receipts of the header 218, and assuming a correct CRC check for the CRC field 212, the rate selector 164 is controlled to operate the detector/decoder 158 at the correct signalling rate of 1, 2, 5 or 8 Mbps, as indicated by the contents of the SIGNAL and SERVICE fields 206 and 208. An octet counter (not shown) is updated until the last detected symbol of the data field 214 has been processed.

As mentioned above, the table in the M-MST 134 stores the data rates that will be used for transmissions to the stations identified by their ID. Referring now to FIG.5, there is shown the format of an ACK (acknowledgement) message 300 used in the LAN 10. The format of the ACK message 300 is generally similar to the format of the message 200 (FIG. 4), and includes a SYNC field 302 and a SFD (start of frame delimiter) field 304, a SIGNAL field 306, a SERVICE field 308, a LENGTH field 310, and a CRC field 312. The fields 302 and 304 form a preamble 316 and the fields 306, 308, 310 and 312 form a header 318. Also included in the ACK message 300 is a DATA field 314 which contains a 16-bit FRAME CONTROL (FC) field 320, a 16-bit DURATION field 322, a 48-bit RECEIVER ADDRESS (RA) field 324 and a 32-bit CRC check field 326. Thus the DATA field 314 contains a total of 14 octets. The ACK message DATA field 314 may be transmitted at the 1 Mbps rate or the 2 Mbps rate, as identified in the SIGNAL field 306. The ACK frame 300 is used by the stations 18 and is also used by the stations 22 when operating at the 1 or 2 Mbps rate. However, when operating at the 5 or 8 Mbps rate, the stations 22 preferably use a shorter ACK message, having the format shown in FIG. 6.

Referring to FIG. 6, there is shown the format of a short ACK message 400, preferably used by the stations 22 when operating at the 5 or 8 Mbps rate. The short ACK message 400 includes a 76-bit SYNC field and an SFD (start-of-frame delimiter) field 404, together forming a preamble 406. The preamble 406 is followed by a data field 408 which include an 8-bit station ID field 410 and a 2-bit field 412 identifying a preferred data rate. The preferred data rate is derived in a receiving station, dependent on receive quality condition and a SNR (signal-to-noise) value with respect to a message received from a transmitting station.

Figure 7:
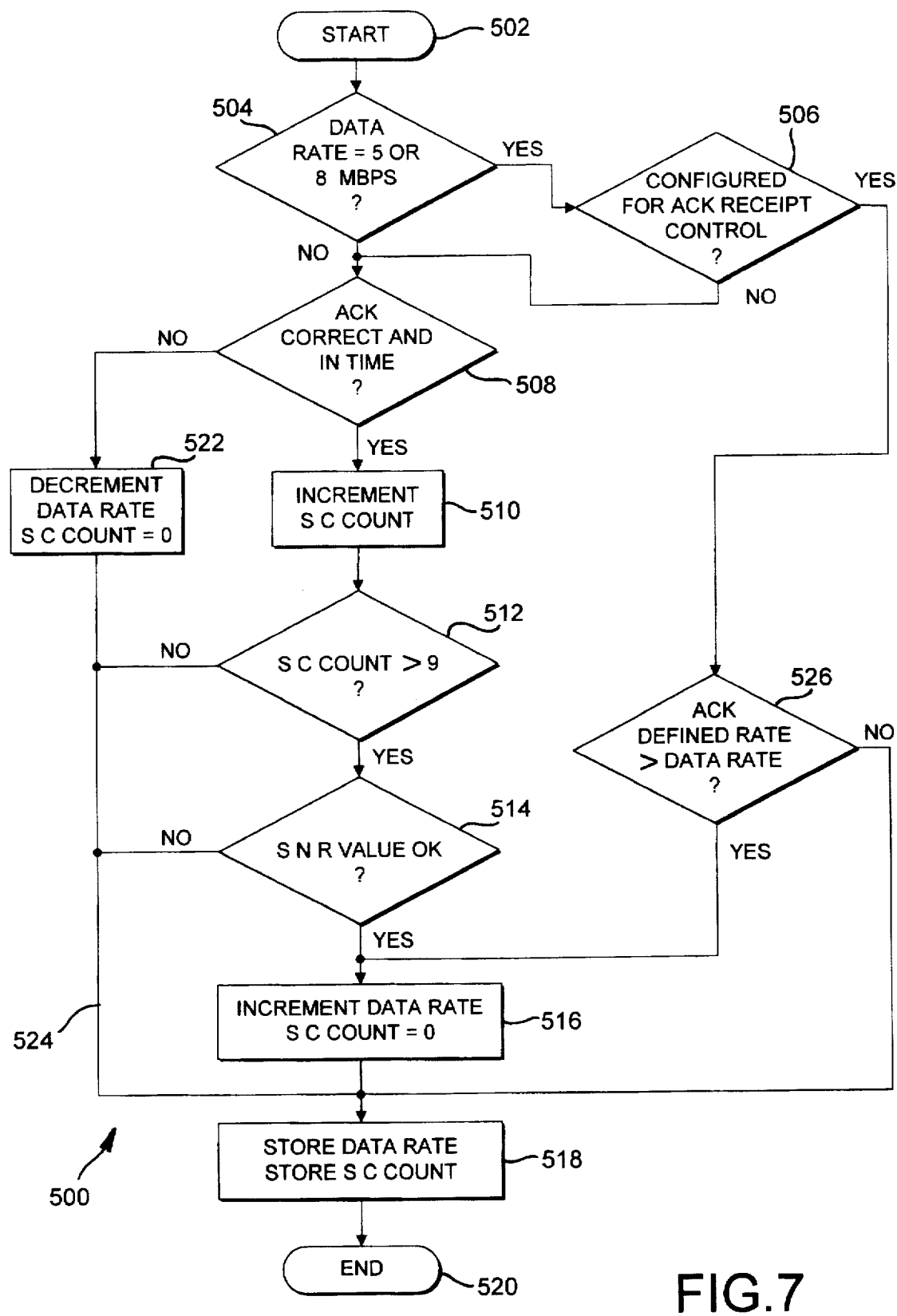
FIG. 7 is a flowchart illustrating the operation of an automatic data rate selection procedure.

Referring now to FIG. 7, there is shown a flowchart 500 illustrating an automatic data rate update procedure for the data rate to be used in the transmit mode, which is implemented in the preferred embodiment described herein for a station 22. The flowchart 500 begins at start block 502. Accordingly, from the start block 502, the flowchart 500 proceeds to block 504, where a determination is made as to whether the data rate is 5 or 8 Mbps. If so, the flowchart proceeds to block 506 (to be described). If not, the flowchart proceeds to block 508 where a determination is made as to whether the ACK has been received and within a predetermined time-out time. If yes, the flowchart proceeds to block 510, where a successive correct (SC) count value is incremented. Next, as seen in block 512, a check is made as to whether the SC count value is greater than a predetermined value, selected as value 9, by way of example. In other words, a check is made as to whether more than nine successive ACK messages have been correctly and timely received. If yes, the flowchart proceeds to block 514 where a check is made as to whether the local SNR (signal-to-noise ratio) value is greater than a predetermined value, suitable for data rate incrementation. (The SNR is the ratio of received signal strength during the reception of the ACK message to the average silence level during periods at which no carrier signal is being received). If the SNR value is suitable, then the flowchart proceeds to block 516, where a data rate incrementation is implemented (if the maximum data rate is not already being used), and the SC (successive correct) count value is reset to zero. Thereafter, the data rate value and SC count value are stored (block 518), and the flowchart ends at block 520.

Returning to block 508, if an ACK message is not received correctly and within the predetermined time interval, then the flowchart proceeds to block 522 where the SC count value is reset to zero and the data rate is decremented (if the minimum data rate is not already being used), and the flowchart proceeds over line 524 to block 518 where the new data rate and SC count value are stored. It should be noted also that if either block 512 or block 514 results in a negative determination, the flowchart also proceeds over line 524 to block 518.

Returning now to block 504, if it is determined that the data rate is 5 or 8 Mbps, then the flowchart proceeds to block 506, where a determination is made as to whether the system is configured for overruling the preferred data rate by a data rate defined by monitoring the receipt of ACK messages. If no, the flowchart proceeds to block 508, previously discussed. If yes, the flowchart proceeds to block 526, where a determination is made as to whether the preferred data rate defined in the short ACK message 400 (FIG. 6) is greater than the actual data rate of the original message being acknowledged. If so, the flowchart proceeds to block 516 where the data rate is incremented and SC count value is reset to zero. If not, the flowchart proceeds directly to block 518 where the data rate and SC count value are stored.

To summarise the procedure described above with reference to the flowchart 500, it will be appreciated that an automatic data rate selection procedure has been described. At a lower data rate the transmission of data is more robust because the detection margin is larger at lower data rates. At a higher data rate the requirements with regard to channel conditions such as SNR, SIR (co-channel interference) and delay spread, are more stringent. If a station 22 doesn't receive the expected ACK message in return correctly and in due time, it will retransmit the original message packet at a lower data rate. If a station 22 does receive the expected ACK messages correctly and in due time from a particular station for a predetermined number of successive times, then it will transmit the next message to that station at a higher data rate. In this way the stations 22 adapt the operating data rate dependent on channel conditions (degradation by noise—SNR, time dispersion in the channel—delay spread) and co-channel interference (SIR).

As mentioned above, the stations 22 preferably use a short ACK message (FIG. 6) when operating at the 5 or 8 Mbps data rates. This ACK message has a duration of only 90 microseconds, in contrast to the ACK message 300 of FIG. 5, which lasts for about 300 microseconds at the 1 Mbps rate, or about 250 microseconds at the 2 Mbps rate. It will be appreciated that stations 18 which detect the transmissions of a short ACK message 400 (FIG.6) will defer until the ACK message has ended, since the ACK message 400 uses DBPSK modulation at the 1 MBaud symbol rate and its transmission time is much less than the transmission time of a long ACK message 300 (FIG.5). An advantage of using the short ACK message 400 (FIG.6) is a significant reduction of the overhead-in-time per transmission.

After a station 22 has transmitted a message using the 5 or 8 Mbps rate, it expects a short ACK message 400 within a time-out period of 30 microseconds. If a carrier signal is detected before 20 microseconds have expired after the end of the abovementioned 30 microsecond period, and if the 4-bit SFD pattern in the SFD field 404 is recognized, then the receipt of a short ACK message is confirmed and the reception of the ACK message is maintained in the 1 Mbps mode.

After a data message has been received at the 5 or 8 Mbps rate, by a station 22, a short ACK message is assembled in the C-MST 132. As illustrated in FIG. 6, such a short ACK message consists of a 76-bit SYNC field 402, a 4-bit SFD field 404, an 8-bit STATION-ID field 410 and a 2-bit PREFERRED DATA RATE field 412.

Figure 8:
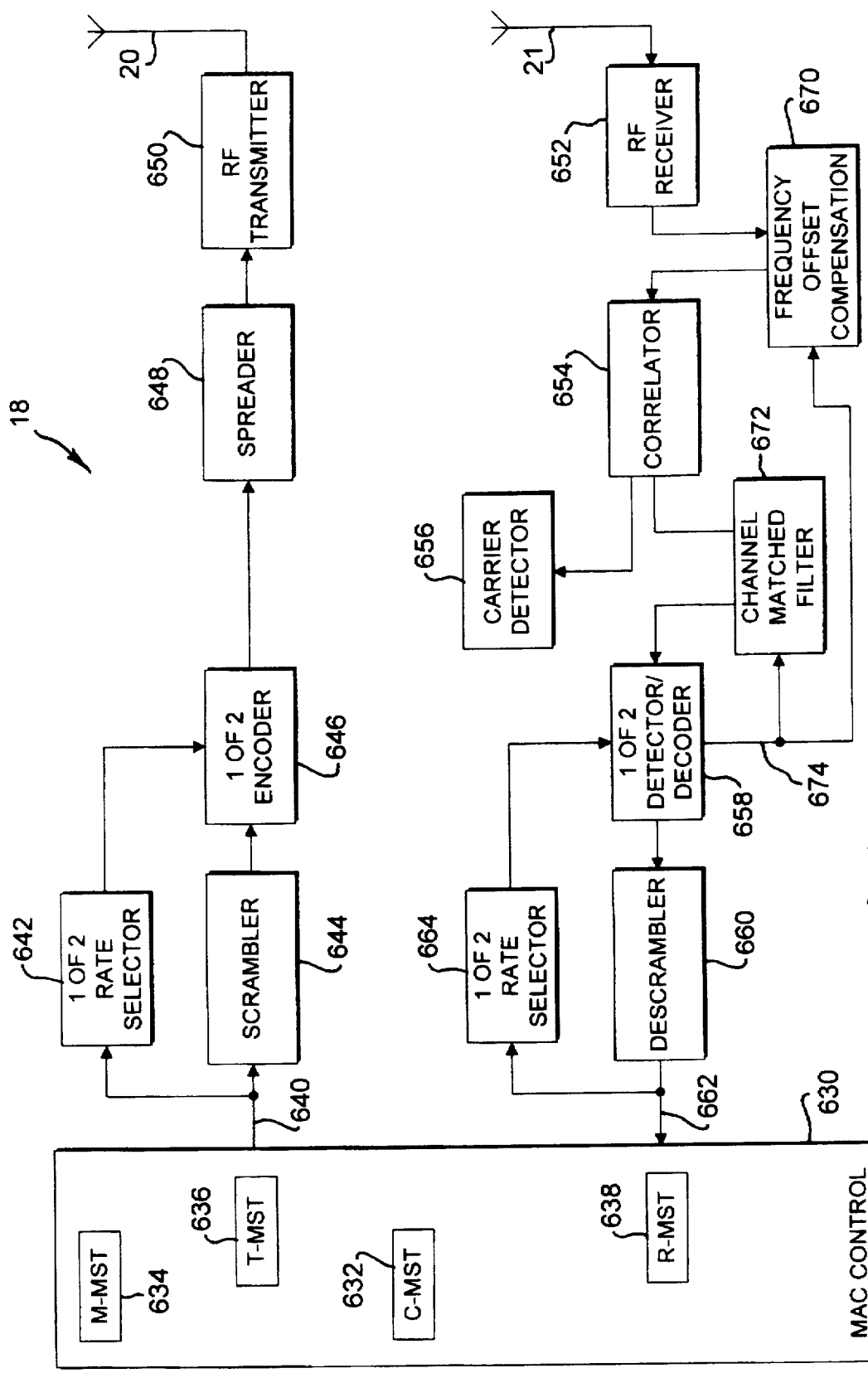
FIG. 8 is a block diagram of a modified embodiment of a LAN station.

Modifications of the described embodiment are possible. For example, a modified block diagram for a station 18 is shown in FIG. 8. Most of the blocks correspond with blocks shown in FIG. 2, and have the same reference number, prefixed by a 6. However, in the receiver section of the embodiment shown in FIG. 8, there is provided a frequency offset compensation circuit 670, connected between the RF receiver 652 and the correlator 654. Also provided in the embodiment of FIG. 8 is a channel matched filter 672 connected between an output of the correlator 654 and the detector/decoder 658. Furthermore, an output of the detector/decoder 658 is coupled over a line 674 to the frequency offset compensation circuit 670 and the channel matched filter 672. These additional blocks 670, 672 are trained during the reception of the preamble and header 216, 218 of a message 200 (FIG. 4) according to an adaptive scheme. A similar modification can be made to the block diagram for a station 22. Although not essential, the addition of the blocks 670, 672 improves the receiver performance and results in a more reliable operation, especially at higher data rates.

In another modification, the mobile stations 18, 22 could be disposed in a so-called "ad-hoc" network, wherein the stations communicate directly with each other. With this modification a wireless LAN would operate without the need for an access point and wired backbone LAN.

We claim:

1. A method of operating a wireless local area network station adapted to transmit and receive messages at a plurality of data rates, wherein said messages include an initial portion and a data portion, including the steps of: transmitting the initial portion of a message to be transmitted by a station at a first predetermined data rate; including in said initial portion at a data rate identification segment identifying a selected one of a plurality of data rates, at which said data portion is to be transmitted, and a length segment representing the length of time which would be required for a transmission of said data portion at one of said plurality of data rates; and transmitting said data portion at said selected one of said plurality of data rates.

2. A method according to claim 1, wherein said length segment represents the length of time which would be required for a transmission of said data portion at a second predetermined data rate said second predetermined data rate being one of said plurality of data rate, and being different from said selected one of said plurality of data rates.

3. A method according to claim 1, including the step of transmitting said message using direct sequence spread spectrum coding.

4. A method according to claim 1, including the steps of receiving at a first station a message directed to said first station and transmitted by a second station, and transmitting from said first station an acknowledgement message to said second station including a recommended data rate portion identifying a preferred data rate for the transmission of messages from said second station to said first station, and utilizing said preferred data rate for at least one subsequent transmission of a message from said second station to said first station.

5. A method according to claim 4, including the steps of determining, at said second station whether a correct acknowledgement message is received within a predetermined time-out period, in response to a message transmitted from said second station to said first station, and utilizing the result of said determination to modify said preferred data rate.

6. A method according to claim 5, wherein said step of utilizing includes decrementing said preferred data rate if a correct acknowledgement message is not received within said predetermined time-out period, and incrementing said preferred data rate if at least a predetermined number of transmitted messages from said second station to said first station each result in the receipt of a correct acknowledgement message within said predetermined time-out period.

* * * * *